(12) United States Patent  (10) Patent No.: US 8,876,254 B2
Nishikawa  (45) Date of Patent: Nov. 4, 2014

(54) IMAGE PRINTING APPARATUS, IMAGE PRINTING METHOD AND RECORDING MEDIUM

(75) Inventor: Hiromitsu Nishikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 65 days.

(21) Appl. No.: 13/189,889

(22) Filed: Jul. 25, 2011

(65) Prior Publication Data

US 2012/0038698 A1 Feb. 16, 2012

(30) Foreign Application Priority Data

Aug. 11, 2010 (JP) ................................ 2010-180465

(51) Int. Cl.
*B41J 2/15* (2006.01)

(52) U.S. Cl.
USPC .................................. 347/41; 347/14; 347/19

(58) Field of Classification Search
USPC .......................... 347/5, 9, 14, 19, 101, 15, 41
See application file for complete search history.

(56) References Cited

U.S. PATENT DOCUMENTS

| 7,914,102 B2 | 3/2011 | Imai |
| 8,157,351 B2 | 4/2012 | Toyama et al. |
| 8,272,712 B2 | 9/2012 | Imai |
| 2004/0169710 A1* | 9/2004 | Ide et al. ........................ 347/101 |
| 2005/0007416 A1* | 1/2005 | Takekoshi et al. ............... 347/41 |
| 2008/0158280 A1* | 7/2008 | Imai ................................. 347/15 |
| 2009/0256871 A1 | 10/2009 | Toyama et al. |
| 2011/0141185 A1 | 6/2011 | Imai |

FOREIGN PATENT DOCUMENTS

| JP | 2005-231350 A | 9/2005 |
| JP | 2007-076149 A | 3/2007 |
| JP | 2008-162095 A | 7/2008 |
| JP | 2009-274437 A | 11/2009 |
| JP | 2010-036508 A | 2/2010 |

OTHER PUBLICATIONS

Nagata et al., "Development of High Image Quality Inkjet Printing Paper KASSAI 'SHASHIN-SHIAGE Pro,'" Fujifilm Research & Development, No. 51-2006, pp. 19-24 (2005), with English abstract.

* cited by examiner

*Primary Examiner* — Lam S Nguyen

(74) *Attorney, Agent, or Firm* — Fitzpatrick, Cella, Harper & Scinto

(57) ABSTRACT

The invention improves uniform glossiness of a printed surface. Glossiness of each of inks installed in a printer is obtained. The inks are sorted in order of glossiness. The number of scans when forming an image by scanning each head is set for each of the inks sorted. Mask data for controlling the number of operations is created.

14 Claims, 14 Drawing Sheets

FIG.6

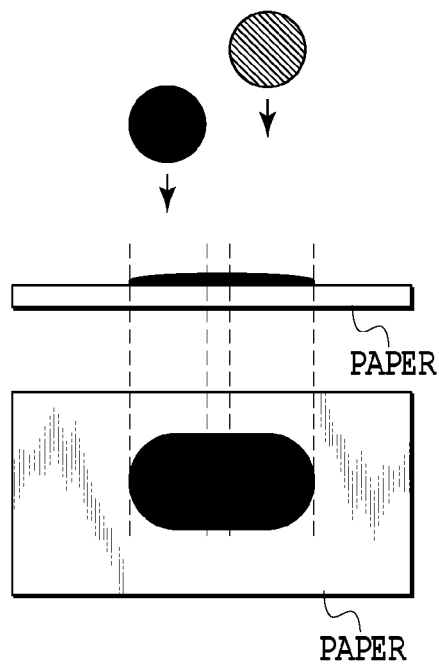 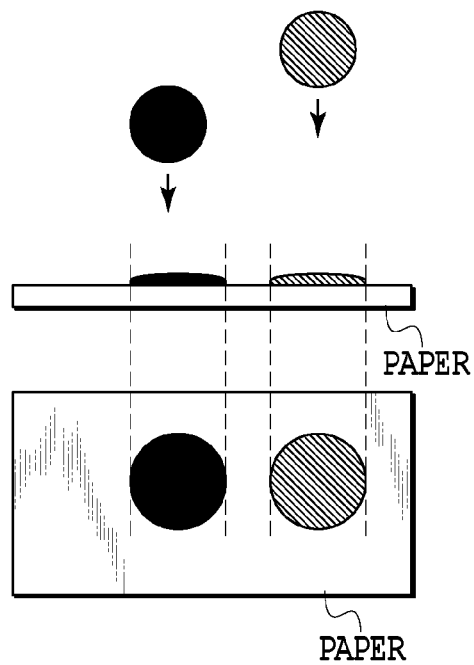
FIG.9A  FIG.9B
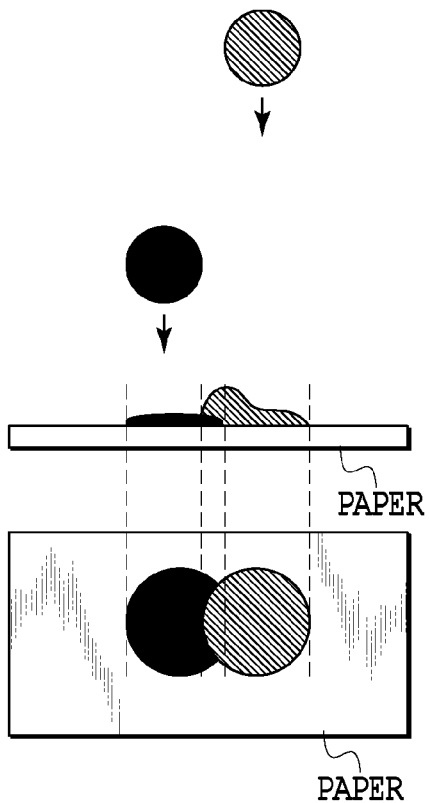
FIG.9C

| | | SURFACE SHAPE | |
|---|---|---|---|
| | | ROUGH | SMOOTH |
| REFRACTIVE INDEX | LOW | INK A LOW (25) | INK B INTERMEDIATE (47) |
| | HIGH | INK C INTERMEDIATE (53) | INK D HIGH (75) |

SPECULAR GLOSSINESS VALUES ARE INSIDE PARENTHESES

IMAGE PRINTING APPARATUS, IMAGE PRINTING METHOD AND RECORDING MEDIUM

BACKGROUND OF THE INVENTION

1. Field of the Invention

The present invention relates to an image printing apparatus and image printing method of an inkjet printer that prints an image by discharging ink onto a printing medium, and more particularly to control of glossiness.

2. Description of the Related Art

Printing an image by an inkjet printer is performed by a printing head discharging small drops of ink onto a printing medium. A method of using piezoelectric elements that generate mechanical strain through applying a voltage, and a method of rapidly heating and vaporizing ink and then using high-pressure air bubbles that are generated are widely used as methods for discharging small drops of ink from a printing head.

The ink that is used in an inkjet printer often uses dye that is easily dissolved in water, however, in recent years, with the aim of improving the light, gas and water resistance of images, pigments are also often used. In pigment type ink, it is known that a coloring material does not easily penetrate into the printing medium and remains on the surface of the printing medium. Therefore, in an image that was printed using pigment ink, the surface shape is different between the non-printed areas and printed areas, and even between the printed areas where a lot of coloring material is used and where less coloring material is used, as a result, uneven glossiness occurs.

The intensity of the glossiness changes due to the refractive index of the material and the surface shape, such that the higher the refractive index is the more intense the glossiness becomes, and the smoother the surface shape is, the more intense the glossiness is. Moreover, in regards to the smoothness of the surface shape, depending on the blurriness of a photographed image, the glossiness felt will change, so the blurriness of a specular reflection image is expressed by an index called gloss clarity that indicates a degree of glossiness. Generally, a person senses glossiness from both the intensity of specular reflected light (corresponds to specular glossiness that is given by the specular glossiness measurement method (JIS Z 8741) and the gloss clarity. In other words, glossiness is expressed by both specular glossiness, which is affected by the refractive index of the surface and also the surface shape, and the gloss clarity (blurriness) that changes according to the surface shape.

Conventionally, a method of installing colorless and transparent ink (hereafter referred to as colorless ink) that does not include any coloring material in a printer has been proposed as a method for eliminating uneven glossiness. In this method, this colorless ink is discharged onto an image together with ink that includes coloring material (hereafter referred to as colored ink) such as CMYK ink. By using colorless ink, glossiness of the image is controlled by controlling the smoothness of the surface of the image without affecting the color of the image, and controlling the refractive index of ink that exists on the outermost surface of the image that greatly affects the specular reflection. The mechanism for this is illustrated in FIGS. 1A to 1D. In FIGS. 1A to 1D, FIG. 1A is a cross-sectional diagram of the printing medium when an image is formed on the printing medium (having a refractive index of n2) using only colored ink (indicated in black and having a refractive index of n1), and FIG. 1B is a cross-sectional diagram of the printing medium when an image is formed also using colorless ink (indicated in white and having a refractive index of n3). The colorless ink does not affect the color, so there is no difference in the color of these two images. As illustrated in these drawings, when an image is formed using only colored ink, and when color is reproduced in half tones so that the ink dots exist in a sparse manner, a difference occurs in the height of the surface of the printing medium and the surface of the ink due to the characteristic of pigment coloring material accumulating up on the surface. Diffused reflection of light occurs on the surface due to the unevenness in height, and as a result the glossiness, and particularly the gloss clarity, worsens. On the other hand, in the image in FIG. 1B where colorless ink is also used, the printing medium is covered by colorless ink, so when compared with the image in FIG. 1A, unevenness of the surface is reduced and gloss clarity is improved. Furthermore, generally the refractive index becomes higher in the order printing medium (n2)<colorless ink (n3)<colored ink (n1). Therefore, when compared with the difference in the refractive index (n1−n2) in the image in FIG. 1A, the difference in the refractive index (n1−n3) in the image in FIG. 1B is lower, and as a result, the unevenness in the glossiness, and particularly the specular glossiness, is suppressed, and often the overall specular glossiness becomes high.

In the case of pigment ink, the amount of pigment particles accumulated on the surface of the paper and the refractive index of the ink differ, so generally the glossiness is different for each ink. FIG. 1C is a cross-sectional diagram illustrating an example of a printing medium when a plurality of inks having different characteristics exist on the printing medium. The dots in the cross-sectional diagram illustrated in FIG. 1C not only have different indices of refraction such as n1, n4 and n5, but also the heights and shapes when accumulated differ due to the amount of solids such as coloring materials and polymers in the pigment inks. The difference in glossiness in that case is explained with reference to FIG. 2. In FIG. 2, the horizontal axis is the amount of ink that is discharged onto the surface of the paper, and the vertical axis is the specular glossiness. The solid line 201 illustrates the transition in the specular glossiness of the primary color gradation of ink, and the dashed line 202 and dotted line 203 illustrate the transitions of specular glossiness of inks having lower indices of refraction. In this way, it can be seen that the lower the refractive index of the ink is, the lower the specular glossiness becomes.

However, even in the case of controlling glossiness using colorless ink, when the glossiness (the uneven shape and refractive index of overlapping ink) is not uniform for each ink as illustrated in FIG. 1C, it is difficult to increase the uniformity of glossiness with only one kind of colorless ink. In other words, even when colorless ink is arranged between dots of ink as illustrated by the cross-sectional diagram of printing medium in FIG. 1D, in which a colorless ink is further applied to the printing medium, the differences in the indices of refraction become sparse as n1−n3, n4−n3 and n5−n3. As a result, the heights of the dots of colored ink also become non-uniform. On the other hand, using a number of colorless inks equal to the number of ink colors in correspondence to the indices of refraction of the inks and the heights of the dots is not a realistic method.

Therefore, the object of the present invention is to improve the uniformity of glossiness of a printed surface by controlling printing in consideration of the differences in the indices of refraction of the inks and the unevenness of the surface.

SUMMARY OF THE INVENTION

In order to solve the problems above, An image printing apparatus provides printing an image to a same area of a printing medium by a plurality of printing scan with a printing head having a plurality of discharge ports for discharging a plurality of color inks, make a plurality of scans, and discharge ink a plurality of times in the same area of a printing medium, wherein the image printing apparatus controls so that the number of scans becomes less for inks having high glossiness in order that ink is not discharged to an adjacent dot in the same area during one scan.

An image printing method in a printer including a printing head having a plurality of discharge ports for discharging a plurality of colors of ink, provides causing the printing head to make a plurality of scans and to discharge ink a plurality of times in the same area of a printing medium in order to reproduce a density of a position that corresponds to image data, wherein the image printing apparatus controls so that the number of scans becomes less for ink of the plurality of colors of ink having low glossiness than ink having high glossiness in order that ink is not discharged to an adjacent dot in the same area during one scan.

In a printer that uses pigment ink for forming an image by discharging the ink through a plurality of scans, the present invention is capable of making the glossiness of an image uniform by individually controlling the number of scans performed when discharging the pigment ink according to a glossiness characteristic of each ink. The present invention is also capable of enlarging a color reproduction range in dark area.

Further features of the present invention will become apparent from the following description of exemplary embodiments (with reference to the attached drawings).

BRIEF DESCRIPTION OF THE DRAWINGS

FIG. 6 is a diagram illustrating the dot arrangement patterning process in the embodiment;

FIG. 9A is a diagram illustrating the state of mixing dots in the embodiment;

FIG. 9B is a diagram illustrating the state of mixing dots in the embodiment;

FIG. 9C is a diagram illustrating the state of mixing dots in the embodiment;

DESCRIPTION OF THE EMBODIMENTS

In the following, the preferred embodiments of the present invention will be explained with reference to the accompanying drawings.

First Embodiment

Figure 3:
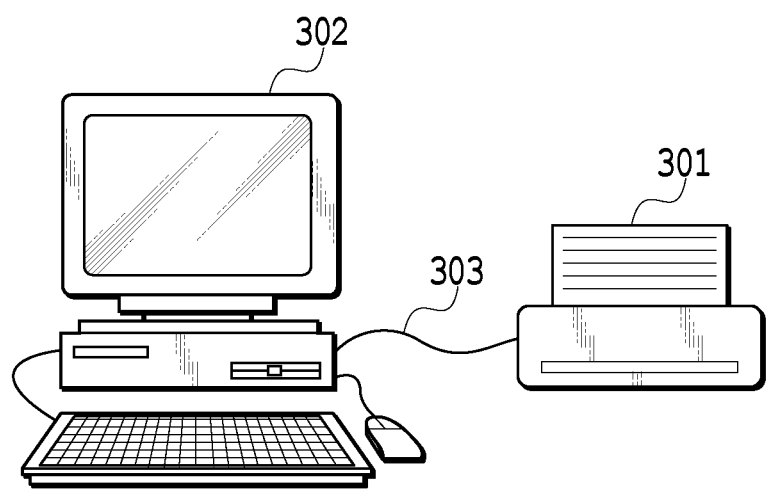
FIG. 3 is a diagram illustrating an example of a printing data generating apparatus in an embodiment.

FIG. 3 illustrates a printing data generating apparatus that is one example of an embodiment of the present invention. In FIG. 3, the system comprises a printer 301, a computer system 302 serving as both a printer controller and a client computer, and a connector cable 303 such as a network cable, SCSI cable, or USB cable.

Figure 4:
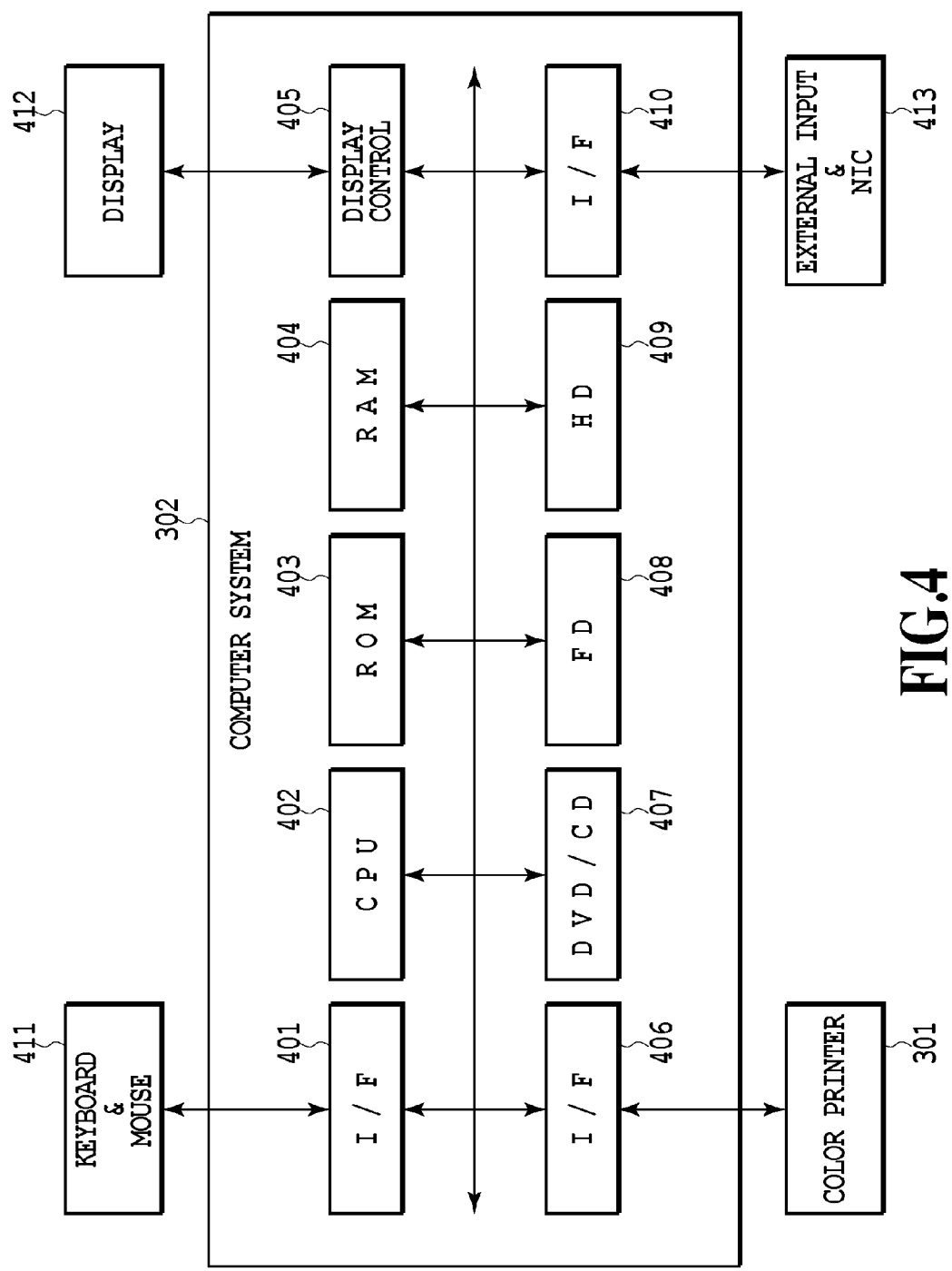
FIG. 4 is a diagram illustrating an example of the printing data generating apparatus in the embodiment.

FIG. 4 is a block diagram that uses blocks to express the main parts of the computer system 302 illustrated in FIG. 3 as function modules.

Referring to FIG. 4, an interface (I/F) 401 connects a mouse and keyboard 411 for a user to input various manual instructions and the like and the computer system 302 to each other. A CPU 402 controls the operation of each of the internal blocks, or executes programs that are internally stored. Necessary image processes are stored in advance in ROM 403, and programs and image data to be processed are temporarily stored in RAM 404 in order for the CPU to perform processing.

A display controller 405 performs control of a display 412 that displays images to be processed, and displays messages to the operator. An interface (I/F) 406 connects the computer system 302 and a color printer 301 to each other. A CD drive 407 reads stored data from or writes data to a CD (CD-R/CD-RW/DVD-R/DVD-RW) serving as one of external memory media.

An FD drive 408 reads from or writes to an FD (floppy disk: registered trademark). When programs for editing images, printer information, or the like are stored on a CD, FD, DVD or the like, these programs are installed onto an HD 409 and can be transferred to RAM 404 as needed. The hard disk (HD) 409 can store programs and image data that are to be transferred to the RAM 404 in advance, and can save image data after processing.

An interface (I/F) 410 connects the computer system with a transmitter 413 such as a modem or network card, which transmits various data that are stored in all locations of the computer system to external devices, or receives various data from external devices.

Figure 5:
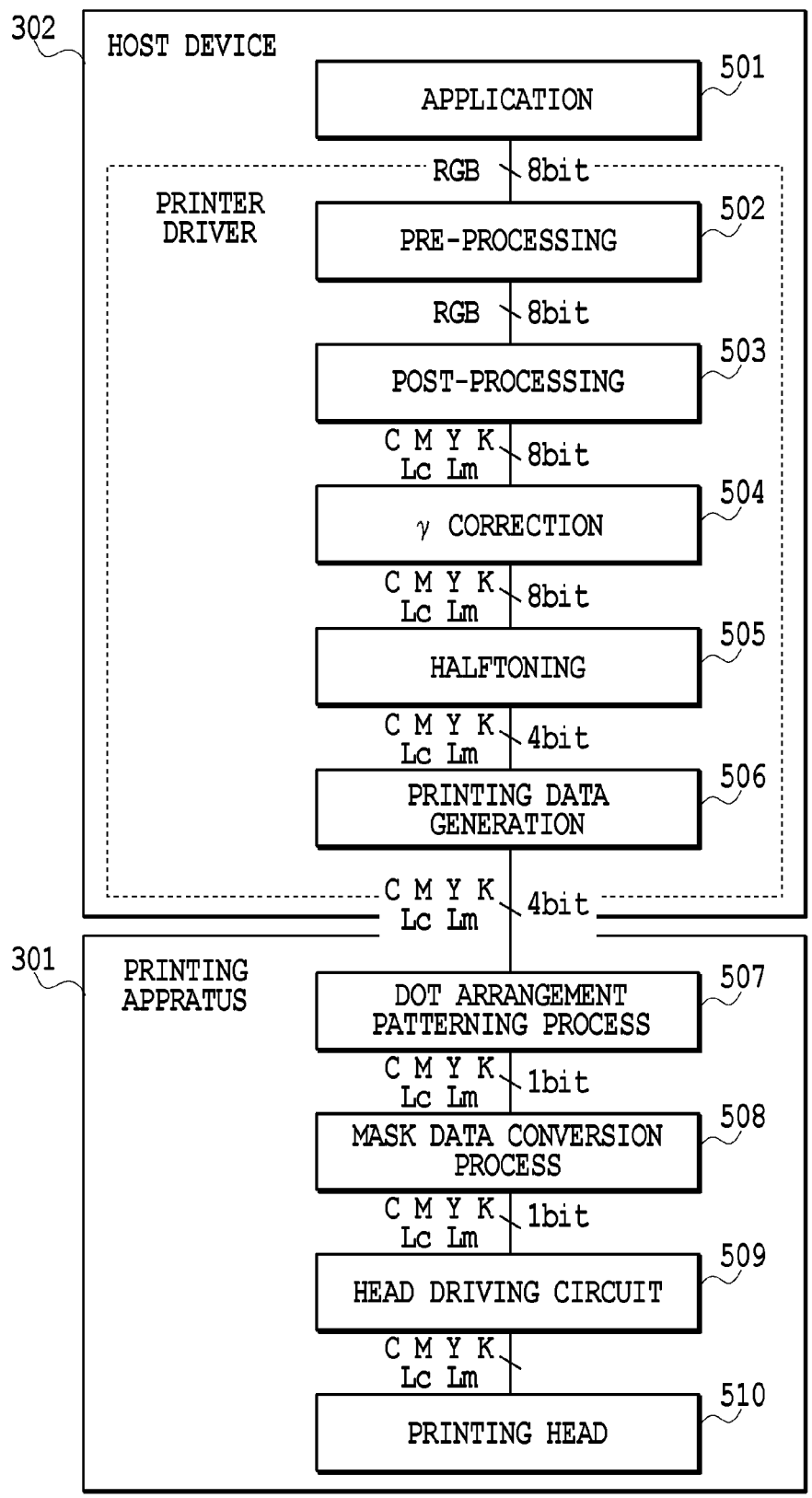
FIG. 5 is a block diagram illustrating an example of the printing data generating apparatus in the embodiment.

FIG. 5 is a block diagram that illustrates the respective function blocks of the printing data generating apparatus illustrated in FIG. 3. The printer of this embodiment performs printing by using pigment ink, so comprises a printing head that discharges the ink. As illustrated in FIG. 3 and FIG. 5, the printing system of this embodiment is substantially composed of the printer 301 as the printing data generating apparatus that uses this pigment ink, and the personal computer (PC) 302 as a host device or image processing device.

As programs that are operated by the operating system of the host device, there are applications and a printer driver. An application 501 executes processing that creates image data that is to be printed by the printer. This image data, or data before being edited as image data, can be obtained by the PC 302 via various kinds of media. The PC 302 of this embodiment can obtain, for example, JPEG formatted image data which was taken by a digital camera, from an external input 413 such as a flash memory via the interface I/F 410. Moreover, the PC 302 can also obtain image data that is stored on the HD 409 or CD-ROM 407. Furthermore, the PC 302 can obtain Web data from the Internet via an NIC 413. Data that is obtained in this way is displayed on the display 412, edited and processed using the application 501, and for example, sRGB standard image data R, G and B is created. When a print instruction is issued, the created image data is provided to the printer driver according to that instruction.

The printer driver of this embodiment performs processing with dividing the processing into respective processes such as pre-processing 502, post-processing 503, γ correction 504, halftoning 505, and printing data creation 506. The pre-processing 502 performs mapping of a color gamut. The pre-processing 502 of this embodiment uses a 3-dimensional look-up table (LUT) that has, as content, a relationship between the color gamut that is reproduced by the sRGB standard image data R, G, B and mapping in the color gamut that is reproduced by the printer of the printing system. The pre-processing 502 also performs interpolation of this and converts the 8-bit image data R, G, B to data R, G, B inside the color gamut of the printer. The post-processing 503 performs processing for finding color separation data such as Y, M, C, K, Lc, Lm that corresponds to a combination of inks that reproduces the colors indicated by the data R, G, B that are mapped in the color gamut. In this embodiment, as in the case of the pre-processing 502, this processing also performs interpolation using a 3-dimensional LUT. The γ-correction 504 performs gradation value conversion for the data of each color of the color separation data found in the post-processing 504. More specifically, by using a 1-dimensional LUT that corresponds to the gradation characteristics of each of the colored inks of the printer used in this system, the γ-correction 504 performs conversion such that the color separation data above is linearly correlated with the gradation characteristics of the printer.

The halftoning 505 performs quantization that converts, for example, each of the 8-bit color separation data Y, M, C, K, Lc, Lm to, for example, 4-bit data. The quantization in this embodiment uses a method of converting 8-bit data to 4-bit data using an error diffusion method. This 4-bit data is data that will function as an index for indicating an arrangement pattern in the process for patterning the dot arrangement in the printing apparatus. Finally, the printing data creation processing 506 creates printing data that adds printing control information to the printing image data, content of which being the 4-bit index data above. The CPU 402 performs the processing of the application and printer driver described above according to the respective programs. When doing that, the programs are read from the ROM 403 or the hard disk 409 and executed, and when executing the respective processing, the RAM 404 is used as a work area.

The printing apparatus performs a dot arrangement patterning process 507 and a masking process 508 as data processing. The dot arrangement patterning process 507 performs dot arrangement according to the 4-bit index data (gradation value information), which is printing image data, for each pixel that corresponds to the actual printed image. In this way, in order that the printer can discharge ink and form an image, ON/OFF dots are defined for each of a plurality of areas in the pixel by assigning, to each pixel that is expressed by the 4-bit data, a dot arrangement pattern that corresponds to the gradation value of that pixel. Discharge data that is either "1" or "0" is arranged for each of the areas in one pixel. The 1-bit discharge data obtained in this manner undergoes mask processing by the masking process 508. In other words, a scanning area having a specified width is scanned once or a plurality of times by a printing head, and discharge data for each scan for printing the image is created by processing that uses a mask corresponding to each of the scans.

The discharge data for each scan Y, M, C, K, Lc, Lm is sent at appropriate timing to a head driving circuit 509, and by doing so, the printing head 510 is driven and discharges the respective inks according to the discharge data. The above-described dot arrangement patterning process and masking process in this printing apparatus are executed under the control of a CPU that forms the control unit of the printing apparatus using hardware circuits that are special for those processes. The CPU may perform these processes according to programs, or these processes may be executed by, for example, the printer driver in the PC, and as will be clear from the following explanation, the form of these processes is not limited when applying the present invention.

In the following, an operational flow in the printing data generating apparatus in FIG. 5 will be explained.

First, the halftoning 505 will be explained. In the following explanation, the smallest compositional unit that is the object of image processing that processes multi-value data expressed using a plurality of bits will be called a pixel, and data that corresponds to a pixel will be called image data. Image processing of multi-value data expressed by a plurality of bits is, for example, the post-processing 503 that perform processing of converting 8-bit RGB data as illustrated in FIG. 5 to 8-bit CMYKLcLm data that corresponds to the ink colors that are used by the printer. Also, this image processing is, for example, the halftone processing 505 that performs processing of quantizing 8-bit CMYKLcLm data to 4-bit CMYKLcLm data. Moreover, from a different aspect, a "pixel" is the smallest unit that can be expressed using gradation, and has gradation value information having a plurality of bits.

Next, the printing data generating process 506 will be explained. For image data that has undergone the halftone processing, printing data for actually inputting the image data to the printing apparatus is then created in a specified format. The printing data that has undergone the halftone process 505 and then created is then supplied to the dot arrangement patterning process 507 of the main printing apparatus.

In the explanation of the halftone process 505 and printing data generating process 506 above, it was presumed that instead of the main printing apparatus, processing was performed by the printer driver that was installed in the host device, however, this embodiment is not limited to this. Even in a configuration where the halftone process itself is performed inside the printing apparatus, the effect of the present invention is equally obtained.

In the following, the dot arrangement patterning process 507 will be explained. In the halftone process 505 described above, a level is lowered from 256-value density information (8-bit data) to 9-value gradation information (4-bit data). However, the information that the printing head of the inkjet printing apparatus of this embodiment can actually print is 2-value information that indicates whether or not ink is printed. The dot arrangement patterning process 507 executes a process of reducing a 0 to 8 (4 bits) multi-value level to a 2-value level that determines whether or not there is a dot. More specifically, in the dot arrangement patterning process 507, a dot arrangement pattern that corresponds to the gradation value (levels 0 to 8) of a pixel is assigned for each pixel that is expressed by the 4-bit data of levels 0 to 8, which is a value outputted from the halftone processing unit 506. By doing so, ON/OFF is defined for each of a plurality of dots that are printed by scanning in one pixel, and 1-bit discharge data, which is either "1" or "0", is provided for each of the dots in the one pixel.

Figure 6:
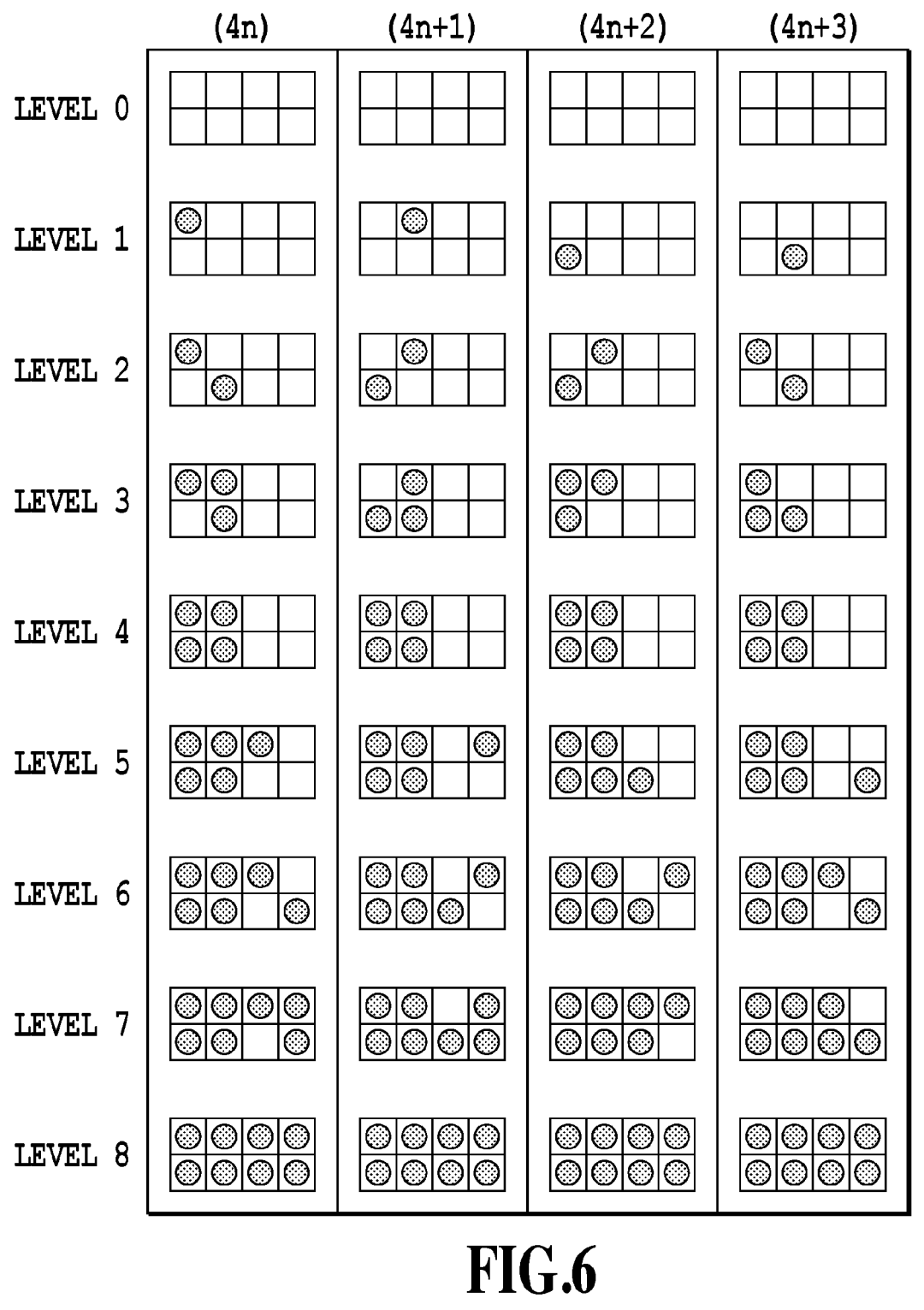

FIG. 6 illustrates output patterns of the input levels 0 to 8 that are converted by the dot arrangement patterning process 507 of this embodiment. Each level value that is indicated on the left of FIG. 6 corresponds to level 0 to level 8, which is the output value from the halftone processing unit 505. Each matrix area on the right side that is composed of 2 dots (vertical)×4 dots (horizontal) corresponds to the area of one pixel that is outputted in the halftone process. Each dot in one pixel corresponds to the smallest unit for which ON/OFF, which indicates whether or not ink is discharged, is defined.

In FIG. 6, areas in which a circle is entered are areas where a dot is to be printed, and as the level increases, the number of dots to be printed also increases by one. In this embodiment, an image is finally printed in which the density information of an original image is reflected in this way. The result of substituting the n in (4n) to (4n+3) with an integer 1 or greater, indicates the pixel position in the horizontal direction from the left end of the input image. The patterns that are illustrated below indicate that even for the same input level, there is a plurality of patterns that are different from each other and prepared according to the pixel position. In other words, even when the same level is inputted, on the printing medium, four types of dot arrangement patterns illustrated by (4n) to (4n+3) are assigned in order, such that the same pattern is not continuous.

In FIG. 6, the vertical direction is set to a direction in which the discharge ports of the printing head are arranged, and the horizontal direction is set to a scanning direction of the printing head. Therefore, as described above, by being able to print using various dot arrangements even for the same level, there is an advantage in that it is possible to disperse the number of times ink is discharged between the nozzles located in the upper portion of the dot arrangement pattern and the nozzles located in the lower portion, and it is possible to disperse various nozzles characteristics to the printing apparatus. After the dot arrangement patterning process 507 explained above is completed, all of the dot arrangement patterns for the printing medium are set.

Controlling the number of scans for each of the inks in this embodiment is achieved by generating switchable mask data according to media information/quality information that is known in this technological field and included in the image data, and applying that mask data to a masking process 508 that is illustrated in FIG. 5.

Figure 7:
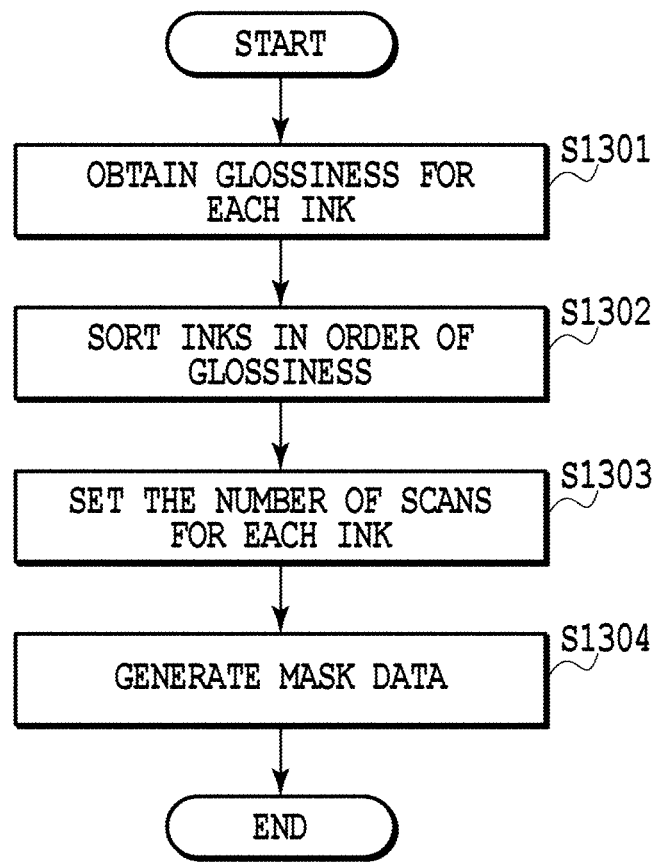
FIG. 7 is a flowchart illustrating the operation by the printing data generating apparatus in a first embodiment.

FIG. 7 is a flowchart of the generation of mask data for the masking process 508 that is operated by the printing data generating apparatus illustrated in FIG. 5. In the following explanation, glossy paper is set as the media information, and high-quality printing is set as the quality information, however, the operation is performed in the same way even when the media information and quality information is changed. The flow of the mask data generation process in this embodiment will be explained below with reference to the flowchart illustrated in FIG. 7.

First, in step S1301, the glossiness of each of the inks installed in the printer is obtained. The glossiness referred to here is at least either the specular glossiness or gloss clarity of the ink surface after each ink has placed onto the glossy paper so that a coverage using the same mask pattern is a maximum. Moreover, the glossiness can be obtained by, for example, causing ink to hit over an area of the printing medium sufficient for measuring each of the specular glossiness and gloss clarity, and obtaining measurement data of the specular glossiness and gloss clarity. Alternatively, it is also possible to input pre-measured data from the keyboard and mouse 411, acquire the data via NIC 413, or as necessary read the data from a DVD/CD 407, or read the data from the HD 409. Furthermore, of the glossiness characteristics, the specular glossiness is known to be highly correlated with the refractive index of the ink, so instead of obtaining the specular glossiness, the glossiness can also be obtained by measuring or inputting the refractive index of each ink. Hereafter, when the refractive index is specified instead of the specular glossiness, it will be presumed that the specular glossiness that is obtained from the ink of the specified refractive index has been specified. Similarly, of the glossiness characteristics, the gloss clarity is known to be highly correlated with the smoothness of the ink layer surface, so it is possible to use the smoothness of the ink layer surfaces of each of the inks instead of the gloss clarity, and execute measurement or input processing. Therefore, hereafter, it is possible to use the smoothness of the ink layer surface instead of the gloss clarity. The obtained ink glossiness is stored in the RAM 404 for later processing, or when there is a large volume of data, a memory device such as the HD 409 can be used.

Next, in step S1302, the printing data generating apparatus 508 sorts the inks in order of glossiness. The glossiness used here is the glossiness characteristics for each ink that were obtained in step S1301, and the inks are sorted based on this glossiness. The sorting performed here is sorting in order of numerical values used when only any one of the specular glossiness and the gloss clarity is the reference. On the other hand, when both the specular glossiness and the gloss clarity are used as the reference, the order can be set according to the average, weighted average, or the like, of the specular glossiness and the gloss clarity. The set result of sorting the inks is stored in the RAM 404 or the like for later processing.

Figure 8A:
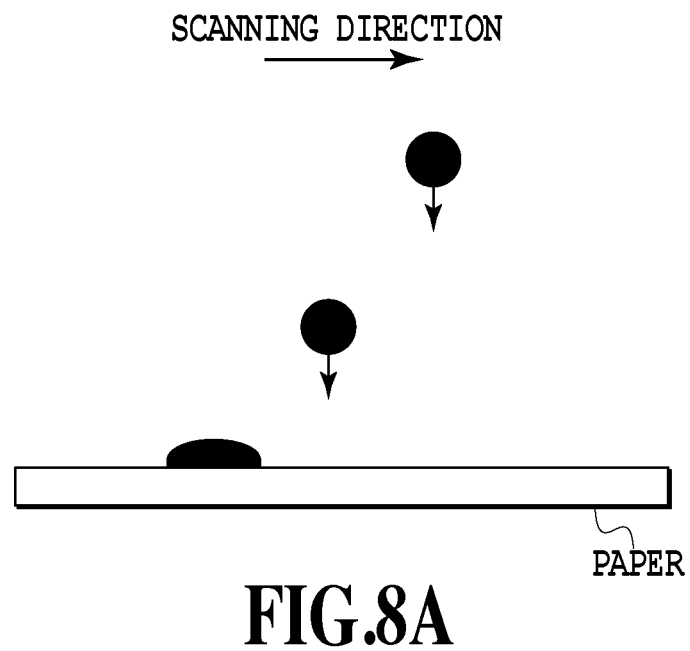
FIG. 8A is a diagram illustrating the state of ink impact according to the number of passes in the embodiment.
Figure 8B:
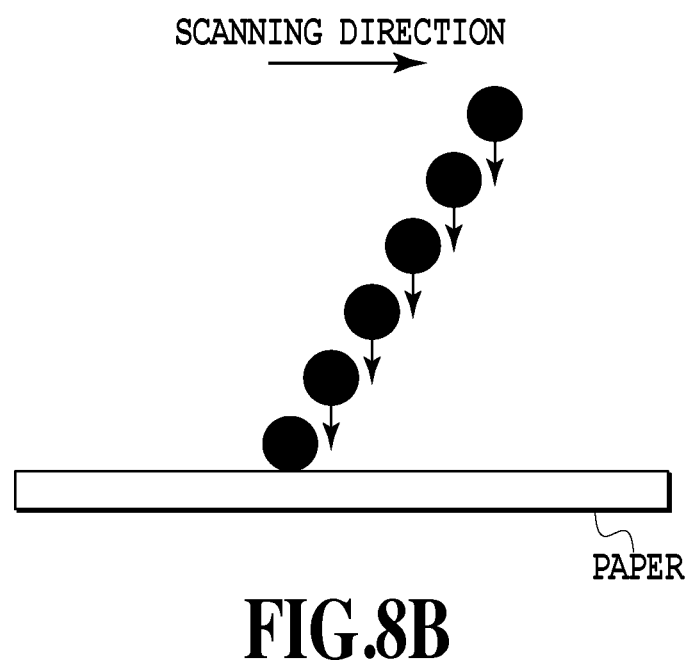
FIG. 8B is a diagram illustrating the state of ink impact according to the number of passes in the embodiment.

In step S1303, the printing data generating apparatus 508 sets the number of scans to be performed when forming an image by scanning with the heads of each of the inks that were sorted in step S1302. Here, FIGS. 8A and 8B will be used to explain the most simple ink behavior model when the number of scans differs. FIG. 8A illustrates the state of the ink near the printing medium when the printing head scans one time, which is the constant number of operations, in the scanning direction, and FIG. 8B illustrates the state of the ink near the printing medium when double the number of scans is performed. As illustrated in FIGS. 8A and 8B, when six drops of ink are discharged per pixel, for example, in the case where the number of scans is double, in FIG. 8A, the number of drops discharged in one scan is one half, or three drops. Generally, when ink arrives at the printing medium and adheres to the printing medium, the ink is divided into a portion that penetrates into the printing medium and a portion that accumulates on top of the printing medium. Here, in referencing FIGS. 8A and 8B, in the case illustrated in FIG. 8A, after a series of processing in which the ink arrives at the printing medium and part penetrates whereas the remaining part accumulates is completed, it is can be seen that the next ink then arrives. On the other hand, in the case illustrated in FIG. 8B, when the next ink drop hits the printing medium before this process is complete, a phenomenon of the drops mixing in a liquid state with each other on the surface of the printing medium occurs. When doubling the number of scans illustrated in FIG. 8A, it is also possible to delay the timing of the ink hitting the printing medium, and it is possible to double the distance between positions where the first drop and second drop hit.

Next, the simple model will be used to explain the mixing of ink drops on the surface of the printing medium with reference to FIGS. 9A to 9C. As was explained above, when increasing the number of scans, lengthening the time spacing between scans is effective. The ink adhesion pattern illustrated in FIG. 9A is for the case where the distance between dots is narrow and the time spacing is short, resulting in the dots mixing in a liquid state with each other on the surface of the printing medium and adhering to the printing medium in the form of one large dot. The ink adhesion pattern in FIG. 9B is for the case where the distance between dots is large, and the time spacing is short, resulting in the dots not coming in contact with each other, so the dots do not mix in a liquid state with each other even though the time spacing is short. In the ink adhesion pattern illustrated in FIG. 9C, the spacing between dots is the same as in FIG. 9A, or in other words the spacing is narrow, however, there is a large number of scans, and because the next small ink drop hits the printing medium after one scan has been performed up to the last pixel, the time spacing becomes long as a result. Therefore, an ink drop that hits first sufficiently goes through the processes of adhering, penetrating and accumulating, after which the next drop hits and overlaps the previous drop. As a result, the ink dots accumulate without mixing in a liquid state. When the ink accumulates without mixing in this way, the shape of the ink surface becomes complex as illustrated in the ink adhesion pattern in FIG. 9C, and the specular glossiness becomes low. On the other hand, when the liquid ink mixes as illustrated in the ink adhesion pattern in FIG. 9A, the specular glossiness becomes high due to the increase in smoothness of the surface. Therefore, by changing the distance or time spacing between the discharges of ink, it is possible to control the specular glossiness of an image.

By using this principle, in step S1303, control can be performed to reduce the specular glossiness by increasing the number of scans the higher the refractive index of the ink is, or to increase the specular glossiness by decreasing the number of scans the lower the refractive index of the ink is, and thus it is possible to achieve a feel of uniform glossiness.

Figures 10, 11:
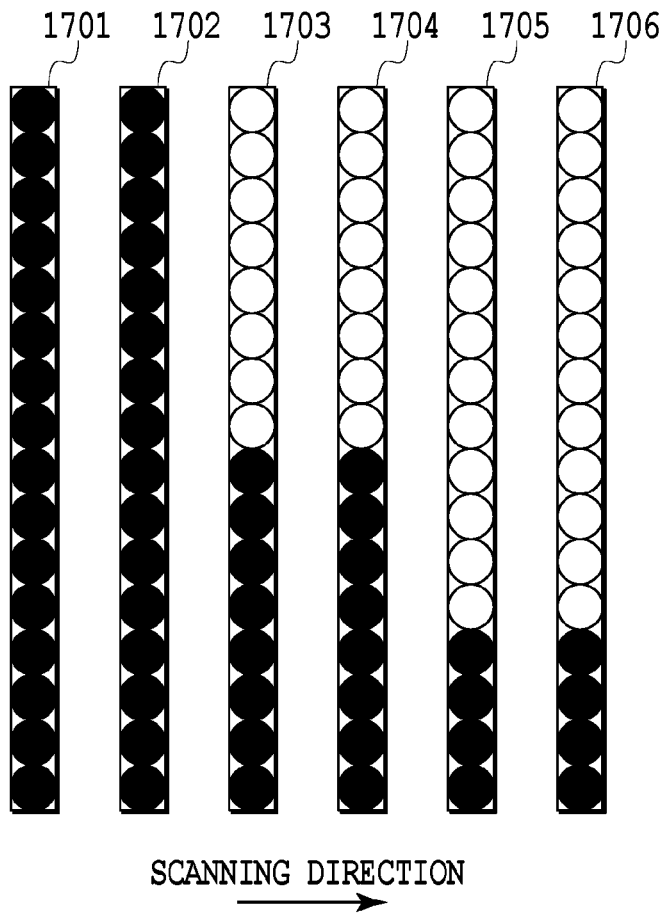
FIG. 10 is a diagram illustrating an example of specular glossiness target values bypass number control in the glossiness control of the embodiment.
FIG. 11 is a diagram explaining the printing head control in the embodiment.

An example of setting the number of scans performed here is illustrated using FIG. 10. As illustrated in FIG. 10, each ink is arranged according to the ink characteristics in a matrix having the smoothness of the surface shape as the horizontal axis, and the size of the refractive index as the vertical axis. As described above, the glossiness is high for a high refractive index of ink and smooth surface shape. As illustrated in FIG. 10, four inks A, B, C and D having different indices of refraction and surface shapes are arranged at suitable locations, and the specular glossiness of each of them, which was calculated by a method disclosed in non-patent literature 1, is assigned in each of parentheses. The surface shape referred to here is the surface shape when each ink is printed on the printing medium using the same number of scans.

As illustrated in FIG. 10, for the ink A that has a low refractive index and a rough surface shape due to, for example, a large particle diameter, the glossiness is low and the specular glossiness is 25. On the other hand, for the ink D that has a high refractive index and a smooth surface shape, the glossiness is high and the specular glossiness is 75. Moreover, for the ink B that has a low refractive index and smooth surface shape, the specular glossiness is 47, and for the ink C that has a high refractive index and rough surface shape, the specular glossiness is 53. Here, in order to achieve a feel of uniform glossiness, when the target value for the specular glossiness is, for example, 50±5 controlling the number of scans in this embodiment is performed as follows. First, for the ink A, in order to increase the specular glossiness, control is performed to reduce the number of scans. As was explained in the model of FIGS. 9A to 9C, by reducing the number of scans, dots mix together in a liquid state, which increases the smoothness of the surface and thus increases the specular glossiness. Next, for the inks B and C, the specular glossiness satisfies the target value, so the number of scans is taken to be the reference. Finally, for the ink D, in order to reduce the specular glossiness, control is performed to increase the number of scans. As was explained in the model of FIGS. 9A to 9C, by increasing the number of scans, the ink drops accumulate on each other, which causes the surface shape to become rough, and thus the specular glossiness becomes low.

The number of scans that is set for each ink is stored in the RAM 404 for later processing, or in the case of a large volume of data, can be stored in a memory device such as the HD 409.

Furthermore, as was described above, the glossiness characteristics in the embodiment include at least one of the specular glossiness (amount of specular reflected light) and the gloss clarity, however, the gloss clarity is also affected by the smoothness of the surface. Therefore, needless to say, by controlling the surface shape in this step S1303, it is possible to control both the specular glossiness and gloss clarity.

Figure 1A:
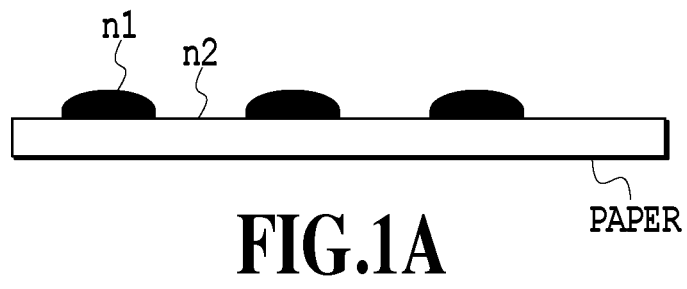
FIG. 1A is a diagram illustrating the effect of using colorless ink in conventional technology.
Figure 1B:
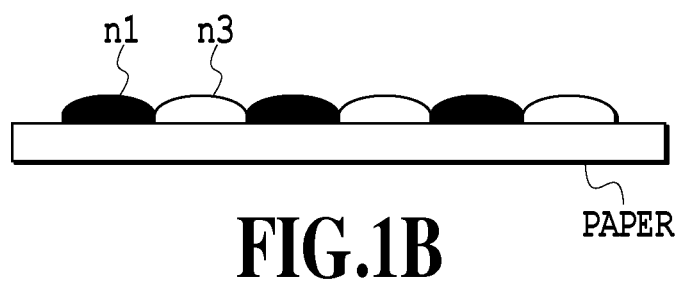
FIG. 1B is a diagram illustrating the effect of using colorless ink in conventional technology.
Figure 1C:
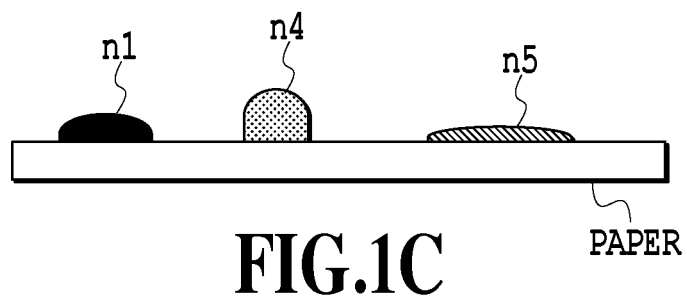
FIG. 1C is a diagram illustrating the effect of using colorless ink in conventional technology.
Figure 1D:
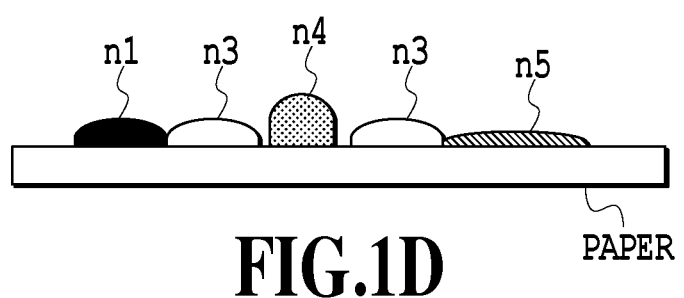
FIG. 1D is a diagram illustrating the effect of using colorless ink in conventional technology.
Figure 2:
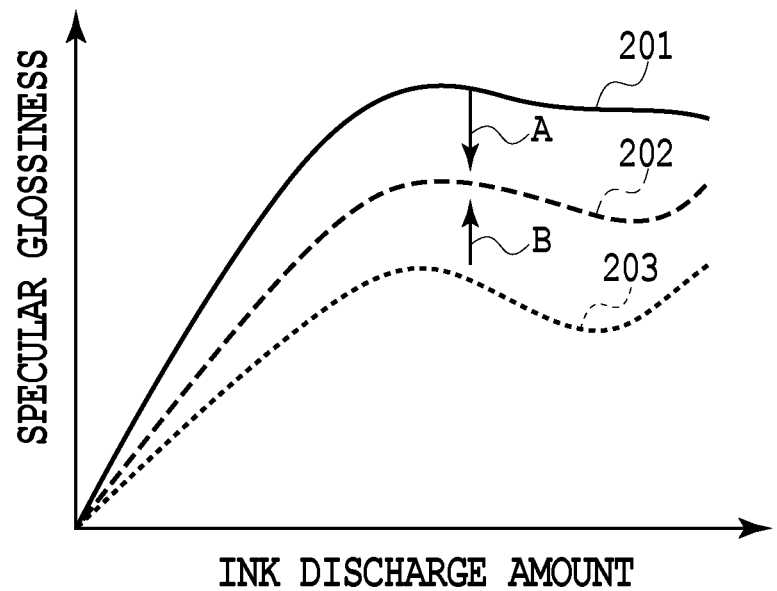
FIG. 2 is a diagram illustrating the difference in glossiness according to ink type.

By performing this kind of operation, it is possible to control the transition lines illustrated in FIG. 2 of the specular glossiness of the inks used, and to control the transition of the solid line 201 so that it moves in the direction of an arrow A to come closer to the dashed line 202. Moreover, similarly, it is possible to reduce the difference in glossiness by controlling the transition of the dotted line 203 so that it moves in the direction of arrow B to come closer to the dashed line 202. The control of the printing head in that case is explained schematically with reference to FIG. 11. FIG. 11 schematically illustrates a printing head having a plurality of nozzle arrays for discharging a plurality of kinds of ink drops. Each nozzle is arranged in a nozzle array 1701 to 1706 orthogonal to the scanning direction such that there is a plurality of nozzles for each ink type. FIG. 11 schematically illustrates only the construction of the printing head, so, for example, when there are actually 800 nozzles for each color, it can be considered that one nozzle in FIG. 11 actually corresponds to 50 nozzles. Also, in FIG. 11, the nozzles indicated in black are nozzles that are used for actual printing (discharge ink), and nozzles indicated in white are nozzles that are stopped (do not discharge ink). By controlling the nozzles that are used and the nozzles that are not used in this way, the number of scans when discharging the same amount of ink drops in the same pixel can be set to double the number used when using nozzle array 1701 than when using nozzle array 1703 as will be described later. In other words, by using a nozzle array having double the number of nozzles, it is possible to double the number of scans for obtaining the same image, and as a result it is possible to control the number of scans. Therefore, as was described above, it is possible to control the number of scans for each ink to control the uniformity of glossiness on the printing medium. Moreover, this kind of scanning can be achieved in the masking process 508, and by the printing data generating apparatus of this embodiment generating mask data and the printing apparatus using the generated mask data, it is possible to control the nozzles that will be used and the nozzles that will not be used.

Figure 12:
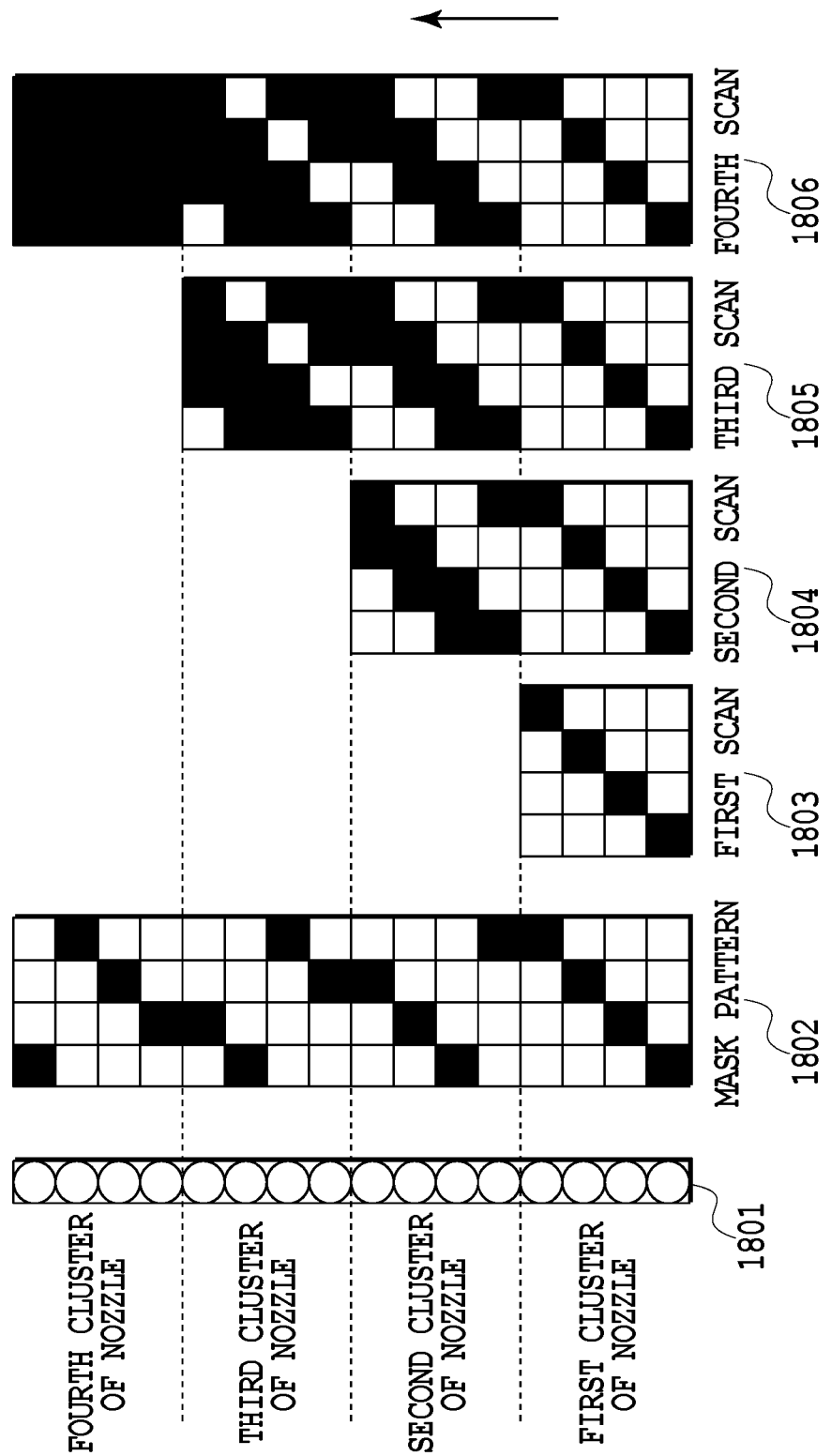
FIG. 12 is a diagram illustrating an example of a mask pattern in the embodiment.

Next, the creation of mask data in step S1304 will be explained below. FIG. 12 is a diagram schematically illustrates a printing head and printing pattern for explaining a multi-pass printing method. For simplicity, a printing head 1801 used has 16 nozzles that are arranged in an array, however, the printing head is not limited to this. As illustrated in FIG. 12, the printing head 1801 is divided into four clusters of nozzles, i.e., a first cluster of nozzles to fourth cluster of nozzles, with each cluster of nozzles having four nozzles. In a mask pattern 1802, an area that each nozzle prints is indicated in black. Patterns that the respective clusters of nozzles print are in a complementary relationship with each other, and printing of an area that corresponds to a 4×4 area is completed when the printing head 1801 scans four times and these patterns overlap. In order to explain this, printing results 1803 to 1806 are illustrated. Referring to FIG. 12, the process of completing an image by overlapping printing scans can be understood. In other words, when the first scan is performed, the mask pattern of the first cluster of nozzles is used and the result is the printing result 1803. After the first printing scan ends, the printing medium is conveyed by an amount equal to the width of a cluster of nozzles in the direction indicated by an arrow in FIG. 12, and the second scan is performed. As a result, as in the printing result 1804, in the second scan, the mask pattern of the second cluster of nozzles is overlapped over the mask pattern of the first cluster of nozzles in the same area. By continuing this, the same area of the printing medium (area corresponding to the width of each cluster of nozzles) becomes as illustrated in the printing result 1806, and by performing four printing scans, the image is finally completed. As described above, an image is formed in each of the same areas of the printing medium by the plurality of clusters of nozzles performing the plurality of scans.

Figure 13:
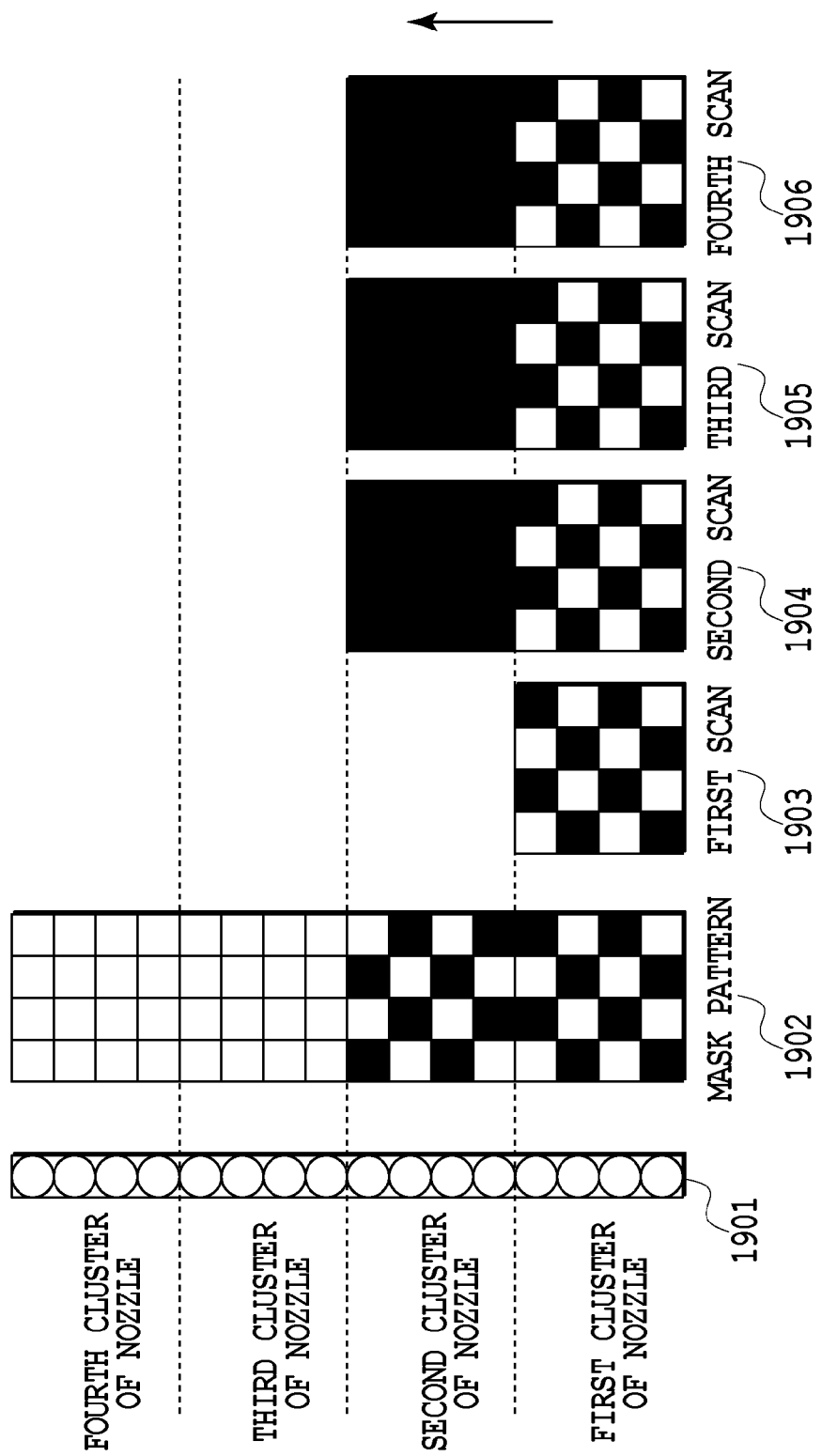
FIG. 13 is a diagram illustrating an example of the mask pattern in the embodiment.

In this embodiment, when all of the nozzles are used as in the nozzle array 1701 illustrated in FIG. 11, mask data as illustrated in FIG. 12 is generated, and used in the masking process 508. Moreover, when using only half of the nozzles in the nozzle array as in nozzle array 1703 illustrated in FIG. 11, the mask pattern is as illustrated in FIG. 13. As in the mask pattern illustrated in FIG. 12, a printing head 1901 is divided into four clusters of nozzles, i.e., first to fourth clusters of nozzles, with each cluster of nozzles having four nozzles. In a mask pattern 1902, areas where the respective nozzles perform printing are indicated in black. Printing patterns that the respective clusters of nozzles print are in a complementary relationship with each other, and printing of an area that corresponds to a 4×4 area is completed by overlapping these patterns. As illustrated in FIG. 13, there are no areas in which the third cluster of nozzles and fourth cluster of nozzles print.

Printing results 1903 to 1906 illustrate the state of completing an image by overlapping printing scans. Every time each of the printing scans ends, the printing medium is conveyed by the amount equal to the width of a cluster of nozzles in the direction indicated by an arrow in the FIG. 13. Therefore, an image is completed in each of the same areas of the printing medium (area corresponding to the width of a cluster of nozzles) by two scans, so it can be seen that by using only half of the nozzles, an image is formed by half the number of scans. In this embodiment, when half of the number of nozzles is used as in nozzle array 1703 illustrated in FIG. 11, the mask data illustrated in FIG. 13 is generated, and used in the masking process 508.

Similarly, when only ¼ of the nozzles are used as in the nozzle array 1705 illustrated in FIG. 11, it is not particularly illustrated in the figure, however, a full mask pattern in which all of the four corners are black is created so that an image is generated by only the first cluster of nozzles. Moreover, in this embodiment, in order to simplify the explanation, an example of a method that divides the nozzles into four groups was explained, however, the present invention is not limited to this. That is, the number of nozzles of the printing head can also, of course, be divided into 8 or 16 groups.

Next, an example of using ink nozzle arrays as illustrated in FIG. 11 will be explained using a printer having six colors of C, M, Y, K, Lc and Lm. The six colors above, for the explanation, have the following characteristics. In other words, inks Lc and Lm are inks having a low coloring material density of ink, so are inks having high surface smoothness. Next, inks C and M have a high coloring material density of ink, however, have a low density when compared with inks Y and K, so are inks having an intermediate surface smoothness. Finally, inks Y and K have a large effect on the size of the color gamut (color reproduction area) for each color density, so are inks having a high coloring material density and low surface smoothness. With this kind of configuration, in order to control the uniformity of glossiness, the following inks are assigned to the respective nozzle arrays. The nozzle array 1701: Lc, nozzle array 1702: Lm, nozzle array 1703: C, nozzle array 1704: M, nozzle array 1705: Y and nozzle array 1706: K. The present explanation is applied only to controlling the number of scans, so the arrangement order of colors in the scanning direction may be changed to any order that is known in this technical field.

The number of nozzle arrays illustrated in FIG. 11 is six, however, the number of nozzle arrays can be changed according to the construction of the printing apparatus to four when the printer has four colors of ink, or can be changed to twelve when the printer has twelve colors of ink. In addition, the nozzle arrays illustrated in FIG. 11 are arranged with the arrays having the largest number of scans on the left, however, the present invention is not limited to this arrangement, and needless to say it is possible to control the number of scans even with the arrays arranged in any order. After step S1304 has finished, the series of operations ends.

Using the method explained above, mask patterns according to the ink glossiness, as illustrated in FIG. 12 and FIG. 13, are set for the masking process 508 that processes signals as illustrated in FIG. 5. In other words, presuming that the inks having the six colors of C, M, Y, K, Lc and Lm are used, mask patterns for four scans as illustrated in FIG. 12 are used by all of the nozzles for the inks Lc and Lm. On the other hand, full mask patterns for one scan are used for the inks Y and K. Using these settings, when discharging the inks Lc and Lm, which are inks having high surface smoothness, the mask patterns for four scans are used, so in one scan, adjacent dots are not continuously discharged. As a result, the ink is accumulated without mixing as illustrated in the ink adhesion pattern of FIG. 9C, so the surface shape of the ink becomes complex and the specular glossiness becomes low. Therefore, transition of the surface glossiness illustrated by the solid line 201 in FIG. 2 changes in the direction indicated by the arrow A and becomes close to the transition illustrated by the dashed line 202.

Next, when discharging the inks Y and K, which are inks having low surface smoothness, the mask patterns for one scan are used, so in one scan, adjacent dots are also continuously discharged. As a result, the ink mixes in a liquid state and becomes one large dot as illustrated in the ink adhesion pattern of FIG. 9A, so the surface smoothness increases and the specular glossiness becomes high. Therefore, the transition of surface glossiness illustrated by the dotted line 203 in FIG. 2 changes in the direction indicated by the arrow B and becomes close to the transition of the dashed line 202. Moreover, by adequately adjusting the mask patterns, the distance between positions where the first drop and second drop hit can be widened, and by using the ink adhesion pattern of FIG. 9B for the C (yellow) ink and M (magenta) ink, the specular glossiness is not greatly changed. As a result, the shape of the ink surface can be controlled mainly as illustrated in FIGS. 9A to 9C, and the glossiness of the image can be made to be uniform.

Moreover, it is not that colorless ink is used to improve the uniformity of the glossiness, so it is not necessary to use the colorless ink for the part of the amount of ink that can be absorbable by the printing medium, and it is possible to use more amount of colored ink. Therefore, this has a particular advantage of making it possible to increase the color reproduction area in areas of shadows where there is a large amount of ink.

According to the method of controlling the number of scans in this embodiment, the glossiness of an image can be controlled, so it is also possible to generate an image having relatively high glossiness, or generate an image having relatively low glossiness. Furthermore, by switching processing between light sections and dark sections of an image to be output, it is also possible to suppress glossiness in dark sections.

In this embodiment, the case of, with inks and printing head being set for an objective printing apparatus, storing in advance mask patterns in a memory device in the printing apparatus or in the control software of a printer was explained. However, in the case where the ink or printing head are replaceable, it is possible to set mask patterns for arbitrary ink or printing heads by executing the process from step S1301 to step S1304 for each ink or printing head after the replacement. This case as well is within the scope of the present invention.

Second Embodiment

In the first embodiment, the method of controlling the number of printing scans based on the glossiness of the ink to achieve uniform glossiness without using colorless ink was explained.

Figure 14:
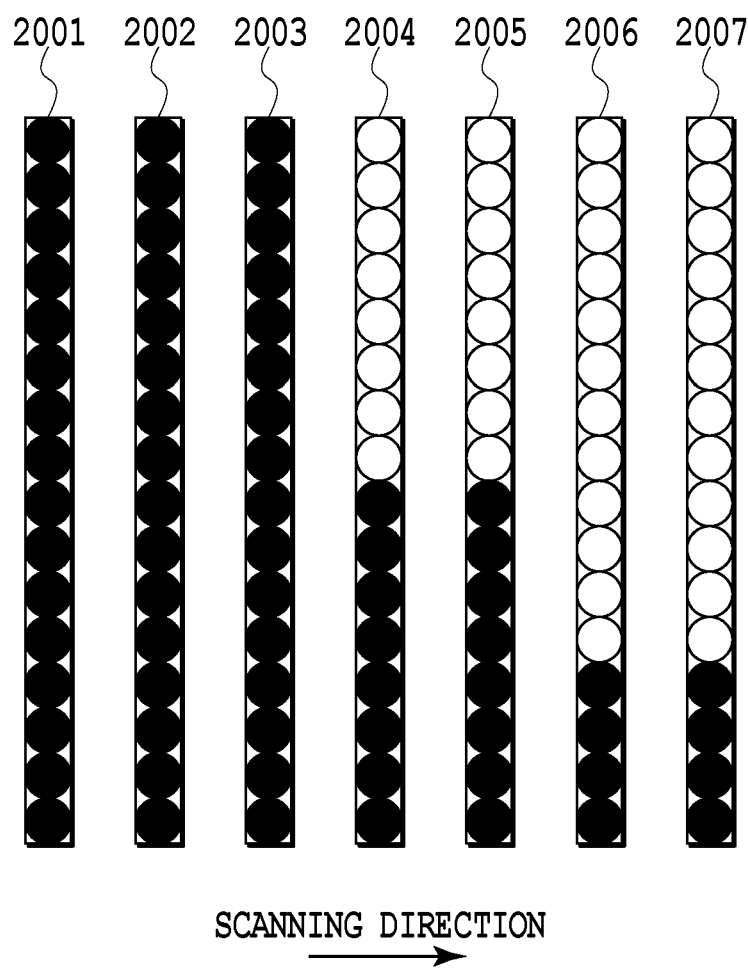
FIG. 14 is a diagram explaining the printing head control in a second embodiment.

This embodiment is a method of executing the scanning control while using the colorless ink. In other words, obtaining the glossiness in the ink characteristics acquisition step S1301 in FIGS. 9A to 9C is performed such that it includes the colorless ink, and in addition to controlling the number of scans as in the first embodiment, the amount of coverage of the colorless ink is controlled so that an overall coverage becomes a fixed value. As a result, it is possible to improve the feel of uniform glossiness of the colorless ink and colored ink. For example, when the colorless ink that is used in this embodiment has higher specular glossiness than the other ink, such as the ink D illustrated in FIG. 10, control is performed to increase the number of scans. By increasing the number of scans, dots accumulate as explained using the model of FIG. 15, the surface shape become rough, and the specular glossiness becomes low. An example of a configuration of the ink and printing head in this case is illustrated in FIG. 14. In the configuration in FIG. 14, a nozzle array for the colorless ink is added to the configuration of FIG. 11. Here, the colorless ink that is used in this embodiment is similar to the ink Lc or Lm of the inks C, M, Y, K, Lc and Lm in that it has higher specular glossiness than the other inks. Therefore, as illustrated in FIG. 14, nozzle arrays are configured such that inks of the arrays are as follows: nozzle array 2001: colorless ink, nozzle array 2002: Lc, nozzle array 2003: Lm, nozzle array 2004: C, nozzle array 2005: M, nozzle array 2006: Y, and nozzle array 2007: K. As a result, through mask processing, it is possible to perform control to increase the number of scans of the colorless ink.

Figure 15:
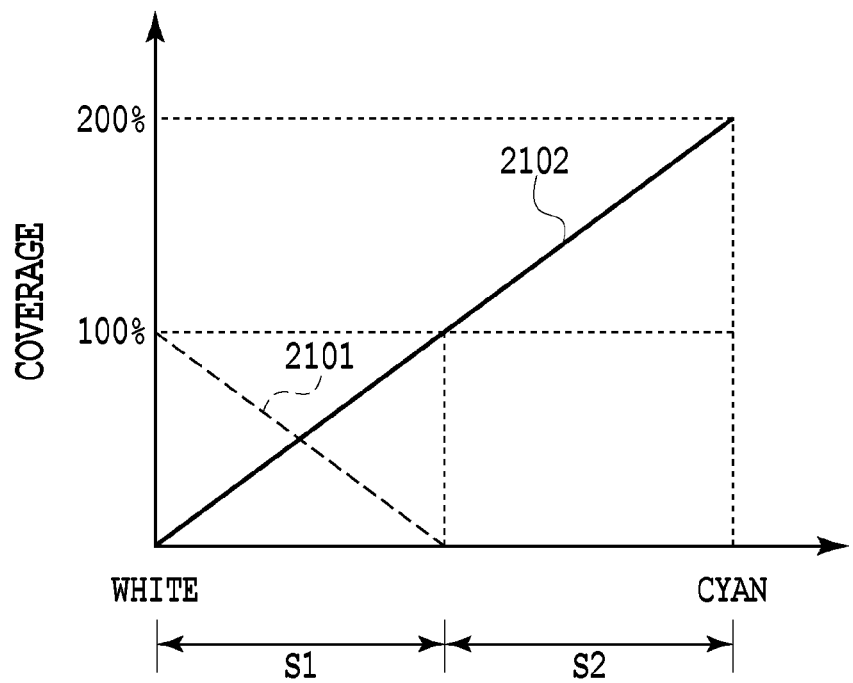
FIG. 15 is a diagram illustrating the amount of ink in cyan gradation in the second embodiment.

In this embodiment, in addition to controlling the number of scans to which the colorless ink has also been added as described above, glossiness near the color of white (R=G=B=255), having a low coverage on the printing medium by ink, is improved using the colorless ink. In other words, the colorless ink is used based on a coverage by colored ink to make the overall glossiness uniform. More specifically, the colorless ink is not used in areas where the coverage by the colored ink exceeds 100%, and in areas where the coverage does not exceed 100%, the colorless ink and colored ink are used together so that the area has a 100% coverage. The amount of ink used in this case, and the change in glossiness will be explained with reference to FIG. 15. FIG. 15 is a graph with gradation from white to cyan along the horizontal axis and coverage along the vertical axis, and illustrates the coverages of colorless ink represented by the dashed line 2101 and cyan ink, which is colored ink, represented by the solid line 2102. From the example illustrated in FIG. 15, in the gradation from white to cyan (C ink), the solid line 2102 that indicates the coverage of C ink is used from 0 to 200%. In this case, as illustrated by the dashed line 2101 that indicates the coverage of the colorless ink, the specular glossiness of white can be improved by using the colorless ink from white first, and discharging ink on a printing medium having low glossiness. Here, the colorless ink can be controlled so that in an area S1 where the coverage of the C ink is less than 100%, the total coverage of the colorless ink and C ink becomes 100%.

Figure 16:
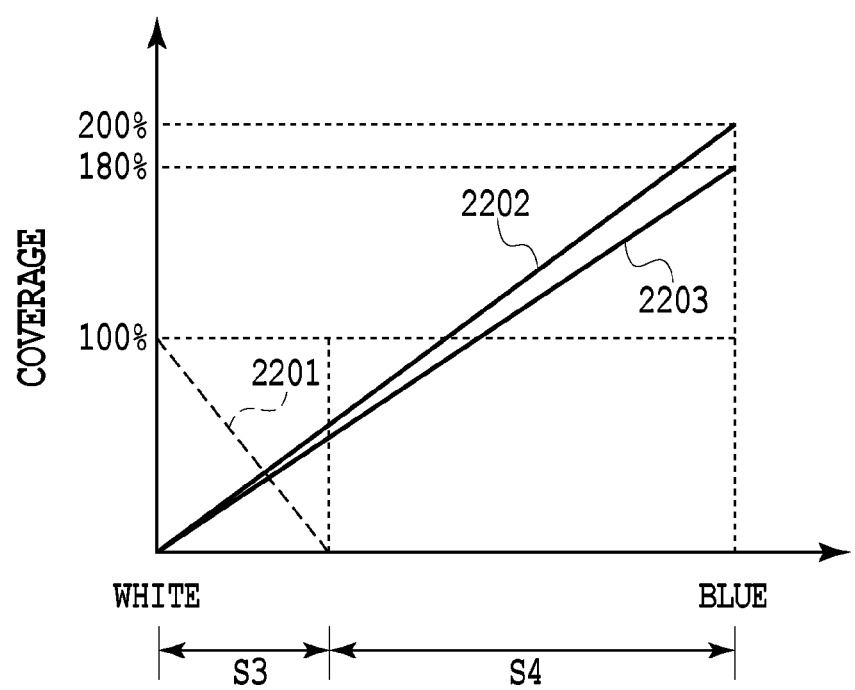
FIG. 16 is a diagram illustrating the amount of ink in blue gradation in the second embodiment.

Moreover, the hue of blue that is adjacent to cyan is explained using FIG. 16. FIG. 16 is a graph with gradation from white to blue along the horizontal axis and coverage along the vertical axis, and illustrates coverages of the colorless ink represented by the dashed line 2201, cyan (C) ink, which is colored ink, represented by the solid line 2202, and magenta (M) ink represented by the solid line 2203. According to the example given in FIG. 16, in the gradation from white to blue, the C ink indicated by the solid line 2202 is used from 0 to 200%, and the M ink indicated by the solid line 2203 is used from 0 to 180%. On the other hand, the colorless ink indicated by the dashed line 2201 is used from white and can improve the specular glossiness of white by being discharged on the printing medium having low glossiness. Here, the colorless ink is controlled so that in area S3 where the total coverage of the C ink and M ink reaches 100%, the total coverage of the colorless ink, C ink, and M ink on the printing medium becomes 100%.

Here, for the explanation, the coverages of C and M in blue were 200% and 180%, respectively, and the coverage from white was linearly increased, however, in this embodiment, control of the colorless ink is not limited to this. In other words, the coverages of C and M in blue can also be such that C=M=200%, or C=160% and M=180%. Moreover, even when control is performed so that the coverage of each ink is increased in a non-linear manner, control of the colorless ink is possible as long as it is within the conditions where intermediate coverage is calculated.

Figure 17:
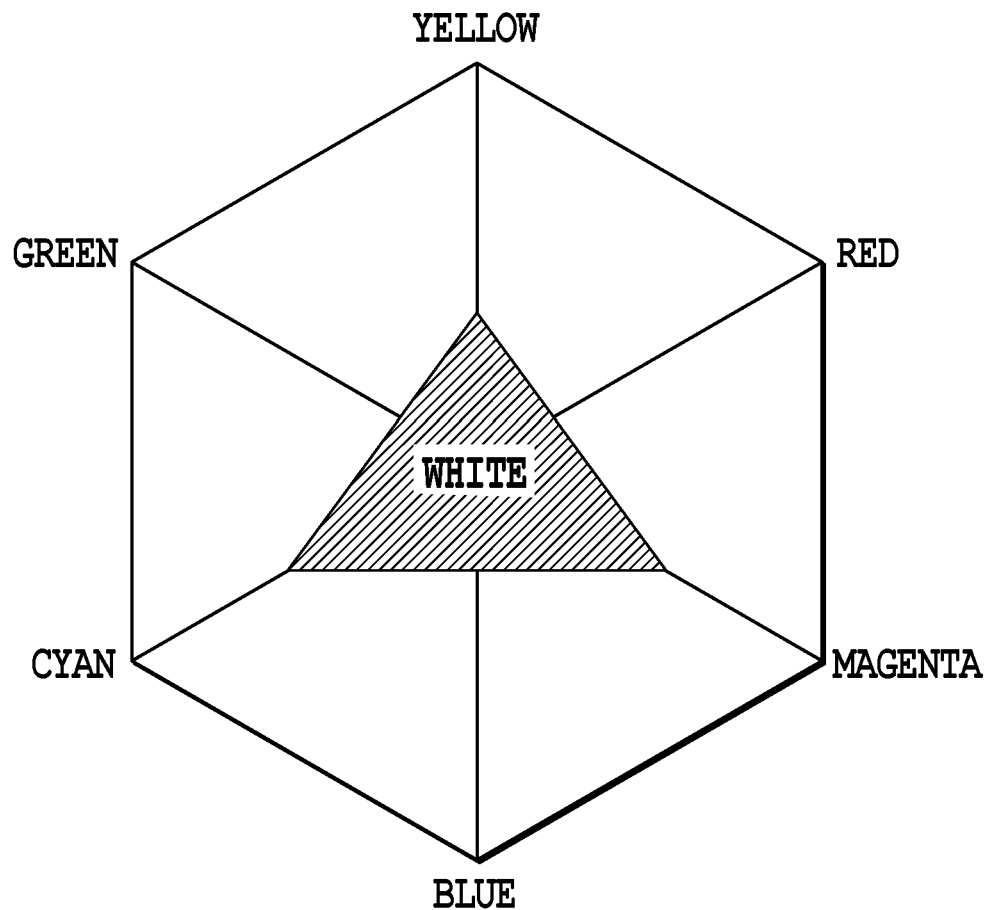
FIG. 17 is a diagram illustrating colorless ink distribution between hues in the second embodiment.

Controlling the coverages of cyan and blue with the colorless ink was explained above, however, for hues other than these as well, it is possible to easily perform control of the colorless ink by calculating the above coverages. When the coverage is also controlled in this way for a color other than blue, the amount of the colorless ink used in an area A that is close to white is set for the areas of each hue circle that can be express with the printer as illustrated in FIG. 17.

As explained above, according to the image printing apparatus of this embodiment, the difference in glossiness between areas where the coverage of colored ink exceeds 100% and areas where the coverage becomes 100% through a combination of the colorless ink and colored ink is reduced. Therefore, by using the colorless ink only in the areas (area A) near white paper, it is possible to make the glossiness uniform in the entire color reproduction range of the printer.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer, for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-180465, filed Aug. 11, 2010, which is hereby incorporated by reference herein in its entirety.

What is claimed is:

1. An image printing apparatus for printing an image to a same area of a printing medium by a plurality of printing scans with a printing head having a plurality of discharge ports for discharging a plurality of inks comprising:
    a scanning unit configured to cause the printing head to perform the plurality of printing scans; and
    a controlling unit configured to control so that the plurality of printing scans becomes less for ink having low glossiness than for inks having high glossiness among the plurality of ink and so that the ink having high glossiness is not discharged to an adjacent dot in the same area during one printing scan,
    wherein the number of scans is such that discharge data on each of the scans, which is used to print by scanning a scan area having a width set by the printing head a plurality of times, becomes less by processing a signal that uses a mask that is set according to each ink.

2. The image printing apparatus according to claim 1, wherein the plurality of inks includes at least three colors of cyan, magenta and yellow.

3. The image printing apparatus according to claim 1, wherein the glossiness is at least one of specular glossiness and gloss clarity when each of the plurality of inks is discharged so that a coverage of the ink on the printing medium is a maximum.

4. The image printing apparatus according to claim 1, wherein the glossiness is a sum, a weighted sum, or a weighted average of specular glossiness and gloss clarity when each of the plurality of inks is discharged so that a coverage of the ink on the printing medium is a maximum.

5. The image printing apparatus according to claim 1, wherein the glossiness is at least one of a refractive index of each of the plurality of inks, and a surface smoothness of a layer of the ink when a coverage of the ink on the printing medium is a maximum.

6. An image printing method in a printer printing an image to a same area of a printing medium by a plurality of printing scans with a printing head having a plurality of discharge ports for discharging a plurality of inks, the image printing method comprising:
    causing the printing head to perform the plurality of printing scans;
    controlling so that the plurality of printing scans becomes less for ink having low glossiness than for ink having high glossiness among the plurality of inks and so that the ink having high glossiness is not discharged to an adjacent dot in the same area during one printing scan,
    wherein the number of scans is such that discharge data on each of the scans, which is used to print by scanning a scan area having a width set by the printing head a plurality of times, becomes less by processing a signal that uses a mask that is set according to each ink.

7. The image printing method according to claim 6, wherein the plurality of inks includes at least three colors of cyan, magenta and yellow.

8. The image printing method according to claim 6, wherein the glossiness is at least one of specular glossiness and gloss clarity when each of the plurality of inks is discharged so that a coverage of the ink on the printing medium is a maximum.

9. The image printing method according to claim 6, wherein the glossiness is a sum, a weighted sum, or a weighted average of specular glossiness and gloss clarity when each of the plurality of inks is discharged so that a coverage of the ink on the printing medium is a maximum.

10. The image printing method according to claim 6, wherein the glossiness is at least one of a refractive index of each of the plurality of inks, and a surface smoothness of a layer of the ink when a coverage of the ink on the printing medium is a maximum.

11. A recording medium that stores a program to make a computer function as an image printing apparatus, the program making the computer function as:
    the image printing apparatus for printing an image to a same area of a printing medium by a plurality of printing scans with a printing head having a plurality of discharge ports for discharging a plurality of inks comprising:
    a scanning unit configured to cause the printing head to perform the plurality of printing scans; and
    a controlling unit configured to control so that the plurality of printing scans becomes less for ink having low glossiness than for inks having high glossiness among the plurality of inks and so that the ink having high glossiness is not discharged to an adjacent dot in the same area during one printing scan,
    wherein the number of scans is such that discharge data on each of the scans, which is used to print by scanning a scan area having a width set by the printing head a plurality of times, becomes less by processing a signal that uses a mask that is set according to each ink.

12. An image printing apparatus for printing an image to a same area of a printing medium by a plurality of printing scans with a printing head having a plurality of discharge ports for discharging a plurality of inks comprising:
    a scanning unit configured to cause the printing head to perform discharging a same ink among the plurality of inks to the same area by the discharging of the plurality of printing scans including a first printing scan and a second printing scan which scans after the first printing scan; and
    a controlling unit configured to control so that an interval of time between the discharging by the first printing scan and the second printing scan becomes less for ink having low glossiness than for ink having high glossiness among the plurality of inks and so that the ink having high glossiness is not discharged to an adjacent dot in the same area during one printing scan, wherein the interval is such that discharge data on each of the scans, which is used to print by scanning a scan area having a width set by the printing head a plurality of times, becomes less by processing a signal that uses a mask that is set according to each ink.

13. An image printing method in a printer printing an image to a same area of a printing medium by a plurality of printing scans with a printing head having a plurality of discharge ports for discharging a plurality of inks, the image printing method comprising:

causing the printing head to perform discharging a same ink among the plurality of inks to the same area by the discharging of the plurality of printing scans including a first printing scan and a second printing scan which scans after the first printing scan; and controlling so that an interval of time between the discharging by the first printing scan and the second printing scan becomes less for ink having low glossiness than for ink having high glossiness among the plurality of inks and so that the ink having high glossiness is not discharged to an adjacent dot in the same area during one printing scan, wherein the interval is such that discharge data on each of the scans, which is used to print by scanning a scan area having a width set by the printing head a plurality of times, becomes less by processing a signal that uses a mask that is set according to each ink.

14. A recording medium that stores a program to make a computer function as an image printing apparatus, the program making the computer function as:

the image printing apparatus for printing an image to a same area of a printing medium by a plurality of printing scans with a printing head having a plurality of discharge ports for discharging a plurality of inks comprising:

a scanning unit configured to cause the printing head to perform discharging a same ink among the plurality of inks to the same area by the discharging of the plurality of printing scans including a first printing scan and a second printing scan which scans after the first printing scan; and a controlling unit configured to control so that an interval of time between the discharging by the first printing scan and the second printing scan becomes less for ink having low glossiness than for ink having high glossiness among the plurality of inks and so that the ink having high glossiness is not discharged to an adjacent dot in the same area during one printing scan, wherein the interval is such that discharge data on each of the scans, which is used to print by scanning a scan area having a width set by the printing head a plurality of times, becomes less by processing a signal that uses a mask that is set according to each ink.

* * * * *